United States Patent
Thakkar et al.

(10) Patent No.: US 10,616,681 B2
(45) Date of Patent: Apr. 7, 2020

(54) SUPPRESSING AMBIENT SOUNDS

(71) Applicant: HEWLETT-PACKARD DEVELOPMENT COMPANY, L.P., Houston, TX (US)

(72) Inventors: Ticky Thakkar, Vancouver, WA (US); Will Allen, Corvallis, OR (US); Richard Sweet, San Diego, CA (US); Robert C. Brooks, Houston, TX (US); Madhu Sudan Athreya, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/765,021

(22) PCT Filed: Sep. 30, 2015

(86) PCT No.: PCT/US2015/053149
§ 371 (c)(1),
(2) Date: Mar. 30, 2018

(87) PCT Pub. No.: WO2017/058192
PCT Pub. Date: Apr. 6, 2017

(65) Prior Publication Data
US 2018/0220231 A1 Aug. 2, 2018

(51) Int. Cl.
*H04R 3/00* (2006.01)
*G10K 11/178* (2006.01)
(Continued)

(52) U.S. Cl.
CPC .......... *H04R 3/005* (2013.01); *G10K 11/178* (2013.01); *G10K 11/1785* (2018.01);
(Continued)

(58) Field of Classification Search
CPC .......... H03G 3/32; G10K 11/178; H04R 5/02; H04R 3/005
(Continued)

(56) References Cited

U.S. PATENT DOCUMENTS

| 4,985,925 A | 1/1991 | Langberg et al. |
| 7,455,271 B2 * | 11/2008 | Pincek .................. F16M 11/14 248/220.21 |

(Continued)

FOREIGN PATENT DOCUMENTS

| EP | 1193684 A2 | 4/2002 |
| JP | 2010232755 A | 10/2010 |
| WO | WO-2011099167 A1 | 10/2013 |

OTHER PUBLICATIONS

Ambient Noise Cancellation http://www.cirrus.com/en/pubs/whitePaper/WP_Ambient_Noise_Cancellation_Comes_to_Mobile_Phone.pdf.
(Continued)

*Primary Examiner* — Alexander Krzystan
(74) *Attorney, Agent, or Firm* — Wall & Tong LLP

(57) ABSTRACT

In example implementations, a system is disclosed for suppressing ambient sounds. In one example, the system includes a camera, a plurality of microphones, a plurality of speakers and a processor. The camera captures an image of a target, the plurality of microphones receives ambient sounds and a plurality of speakers outputs an audio signal to suppress the ambient sounds. The processor is in communication with the camera, the plurality of microphones and the plurality of speakers. The processor can identify a location on the target based on the image that is captured, determine a direction and a frequency of the ambient sounds, and generate the audio signal based on the direction and the frequency of the ambient sounds, the audio signal is directed towards the location on the target.

10 Claims, 5 Drawing Sheets

(51) Int. Cl.
*H04M 3/56* (2006.01)
*H04N 7/14* (2006.01)
*G06K 9/00* (2006.01)
*H04R 27/00* (2006.01)

(52) U.S. Cl.
CPC ....... *G10K 11/17881* (2018.01); *H04M 3/568* (2013.01); *H04N 7/147* (2013.01); *G06K 9/00221* (2013.01); *G10K 2210/111* (2013.01); *G10K 2210/12* (2013.01); *H04R 27/00* (2013.01); *H04R 2410/05* (2013.01)

(58) Field of Classification Search
USPC .................. 381/306, 71.2, 71.8, 57, 387
See application file for complete search history.

(56) References Cited

U.S. PATENT DOCUMENTS

| | | | |
|---|---|---|---|
| 8,219,394 B2 | 7/2012 | Flaks et al. | |
| 8,311,233 B2 | 11/2012 | Kinghorn | |
| 8,411,963 B2 | 4/2013 | Luff | |
| 8,538,492 B2* | 9/2013 | Sweeney | G10K 11/178 455/570 |
| 9,111,522 B1 | 8/2015 | Worley, III | |
| 9,652,031 B1* | 5/2017 | Savastinuk | G06F 3/012 |
| 2004/0234080 A1 | 11/2004 | Hernandez | |
| 2008/0199037 A1* | 8/2008 | Xu | H04R 1/345 381/387 |
| 2008/0304677 A1* | 12/2008 | Abolfathi | G10K 11/178 381/71.1 |
| 2009/0312849 A1 | 12/2009 | Cosgrove et al. | |
| 2010/0081487 A1 | 4/2010 | Chen et al. | |
| 2011/0150247 A1* | 6/2011 | Oliveras | G06F 1/1688 381/304 |
| 2012/0069242 A1 | 3/2012 | Pearlstein | |
| 2013/0121515 A1* | 5/2013 | Hooley | H04R 1/403 381/307 |
| 2013/0279706 A1 | 10/2013 | Marti | |
| 2013/0332157 A1 | 12/2013 | Iyengar et al. | |

OTHER PUBLICATIONS

Kurimoto, S. et al, "The Suppression for Undesired Reflection Towards Audio Spot", Aug. 23-27, 2010.

\* cited by examiner

SUPPRESSING AMBIENT SOUNDS

BACKGROUND

Systems supporting collaboration of remote participants often include one or more audio channels. However, ambient noise is everywhere and may affect the signal to noise ratio of the one or more audio channels. Noise reduction headphones and earbuds are available to reduce the amount of ambient noise.

DETAILED DESCRIPTION

The present disclosure discloses a system and method for suppressing ambient sounds. In certain communication systems, such as a video/audio conference call, a high signal to noise ratio is desirable. For example, ambient sounds can affect the ability of a user to hear incoming audio clearly and to send audio clearly.

Noise reduction headphones and earbuds are available. However, headphones and earbuds are worn by a user and can be uncomfortable or cumbersome. In addition, the headphones and earbuds are personal and work on a single participant.

The present disclosure provides a system and method for suppressing ambient sounds without wearing headphones or earbuds. In addition, the present system can be used to suppress ambient sounds for multiple users that are within a zone of operation of the system. The present disclosure can also be used to suppress ambient sounds when the user sends an audio signal. As a result, the present disclosure provides a more satisfying experience for certain communication systems, e.g., such as a video/audio conference call.

Figure 1:
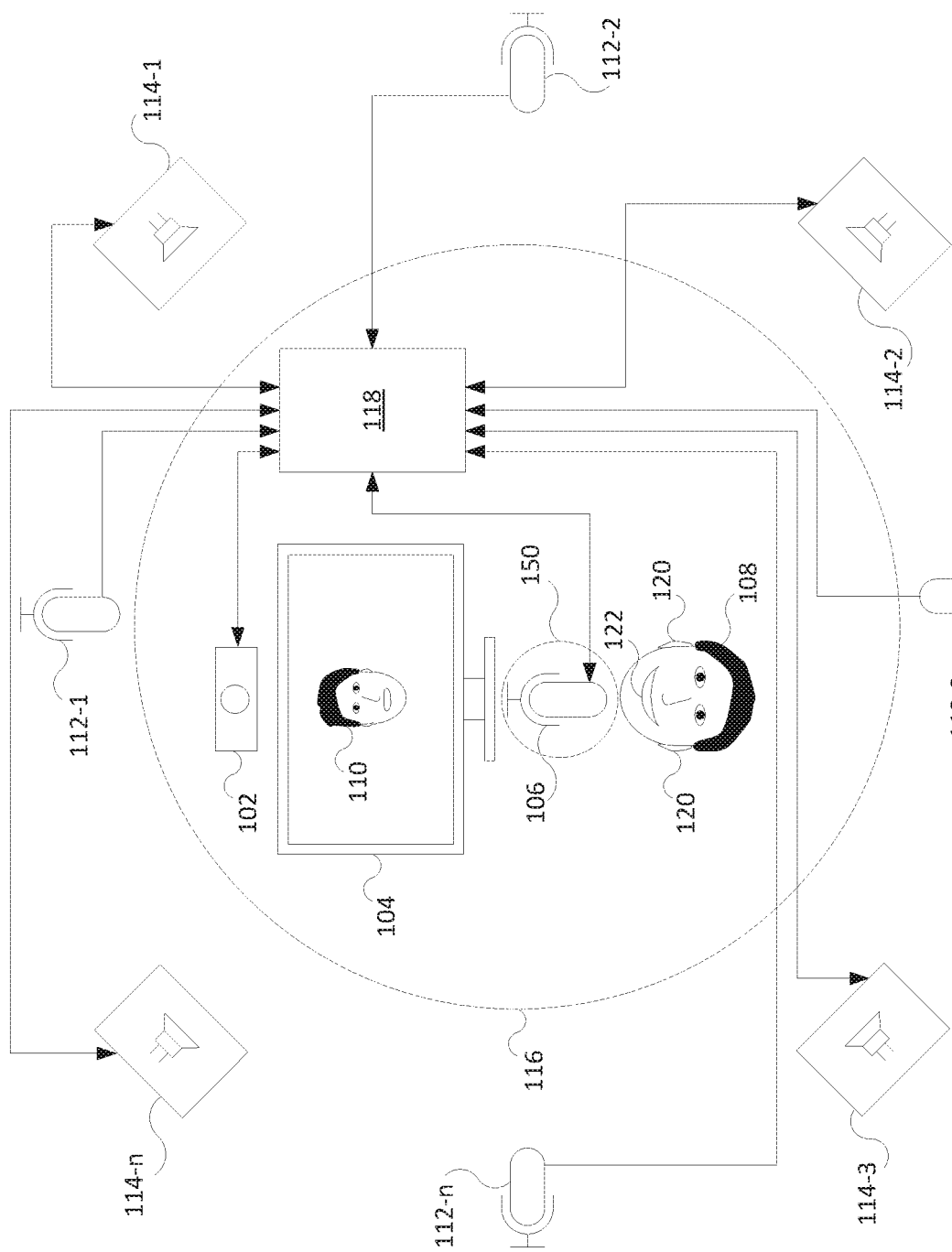
FIG. 1 is a block diagram of an example system of the present disclosure.

FIG. 1 illustrates a block diagram of an example system 100 of the present disclosure. The system 100 may include a camera 102, a voice microphone 106, a server 118, a plurality of ambient sound microphones 112-1 to 112-n (hereinafter referred to collectively as ambient sound microphones 112 or individually as ambient sound microphone 112) and a plurality of speakers 114-1 to 114-n (hereinafter referred to collectively as speakers 114 or individually or speaker 114). Although only a single camera 102 is illustrated, a plurality of cameras 102 may be placed strategically in the room such that a speaker 114 facing directly into the camera 102 is identified as a speaker 114 of interest.

In one example, a user 108 may be conducting a conference call (e.g., either a video conference call or an audio only conference call) with a second user 110. FIG. 1 illustrates an example of a video conference call with a display 104 that shows the second user 110.

In one implementation, the user 108 may be within a zone of operation 116 represented by dashed lines. Although the zone of operation 116 is illustrated as being a circular shape, it should be noted that the zone of operation 116 may have any regular or irregular volume in space (e.g., a volume as in a width, height and depth of a sphere, cube, and the like). The system 100 may be operated to suppress ambient sounds so that the signal to noise ratio is maximized for the conference call within the zone of operation 116.

In one example, the system 100 may automatically begin operating when the user 108 is detected to be within the zone of operation 116. For example, the user 108 may be detected by the camera 102.

In one example, the server 118 is modified to perform the functions described herein. The server 118 may include a processor and non-transitory computer readable storage media. The non-transitory computer readable storage media may store instructions that perform the functions and methods described herein (e.g., the blocks of the method 400 and the method 500, described below).

In some implementations, the server 118 may be in communication with the camera 102 to process video images, in communication with the voice microphone 106 to process audio inputs (e.g., the user 108's voice), in communication with the ambient sound microphones 112 to process a direction, an amplitude, and a frequency of the ambient sounds, and in communication with the speakers 114 to output a counter soundwave (broadly an audio signal) based on the direction, amplitude, and frequency of the ambient sounds to suppress the ambient sounds.

In one example, the camera 102 may be able to move in three different axes or directions (e.g., pitch, roll and yaw, xyz coordinates, and the like) to track the face of the user 108. In one example, the speakers 114 may be mounted on a mechanical mount that can also move in three different axes or directions (e.g., pitch, roll and yaw, xyz coordinates, and the like) and be controlled by the server 118. For example, the server 118 may rotate or position the speakers 114 such that the counter soundwave that is generated is outputted in a direction towards ears 120 of the user 108.

In another example, the speakers 114 may be statically positioned or aimed at the user 108 (e.g., aimed at the ears 120 of the user 108). The server 118 may change a phase of the signal that is driving the speakers 114. For example, delaying a signal may be equivalent to moving the speakers 114.

In one example, the ambient sound microphones 112 may be located around a perimeter of the zone of operation 116. Using the ambient sound microphones 112, the direction of the ambient sounds may be determined. Thus, when the server 118 calculates the counter soundwave, the counter soundwave may be generated and output by a speaker 114 such that the phase of the counter soundwave and phase of at least one selected ambient sound frequency are synchronized at least one point in the zone of operation 116.

In one example, the camera 102 may be any type of camera that can capture video images of a target (e.g., the user 108). For example, the camera 102 may be a red, green, and blue (RGB) video camera, a depth sensor camera, and the like. In one implementation, the camera 102 may be used to identify where the user 108 is located and the exact location of the ears 120 of the user 108.

In one example, the camera 102 may be a pair of infrared (IR) cameras to detect the gaze of the user 108, accomplished by looking at the pupils and estimating the direction. The pair of IR cameras may be used for a single user video conference for finer control face pose/ear detection. The pair of IR cameras can be used to determine where the user 108 is looking, whether at the monitor or elsewhere, and in some cases, within the monitor if the user 108 is looking at the video conference session window, or another window within the monitor that is not relevant to the session.

Figure 2:
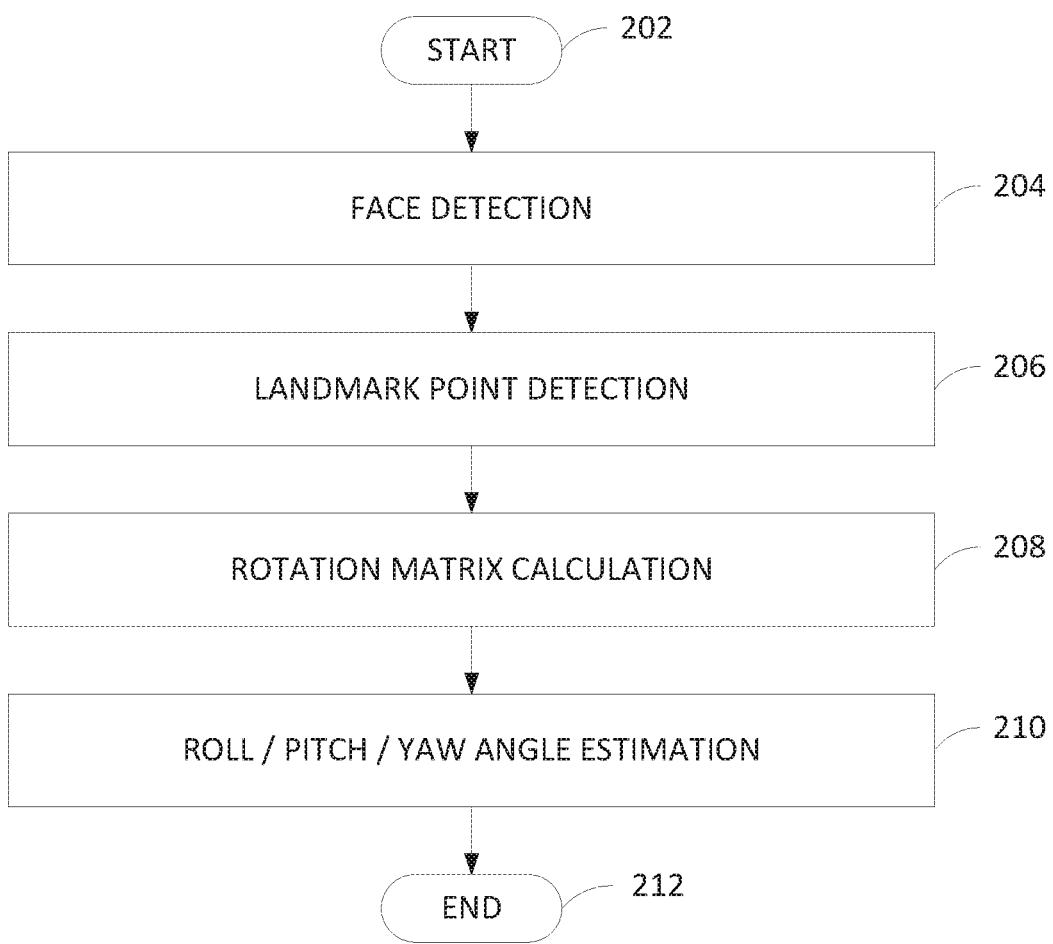
FIG. 2 is a flow diagram of an example method for determining a location of a facial feature.

FIG. 2 illustrates a high level block diagram of an example method 200 that can be used to determine a location on the target. In one example, the location may be a facial feature of the target, such as, the user 108 (e.g., the ears 120, a mouth 122, and the like). The method 200 may be performed by the server 118.

At block 202, the method 200 begins. At block 204, the method 200 performs a face detection. For example, the video images captured by the camera 102 may be analyzed to detect a face.

Figure 3:
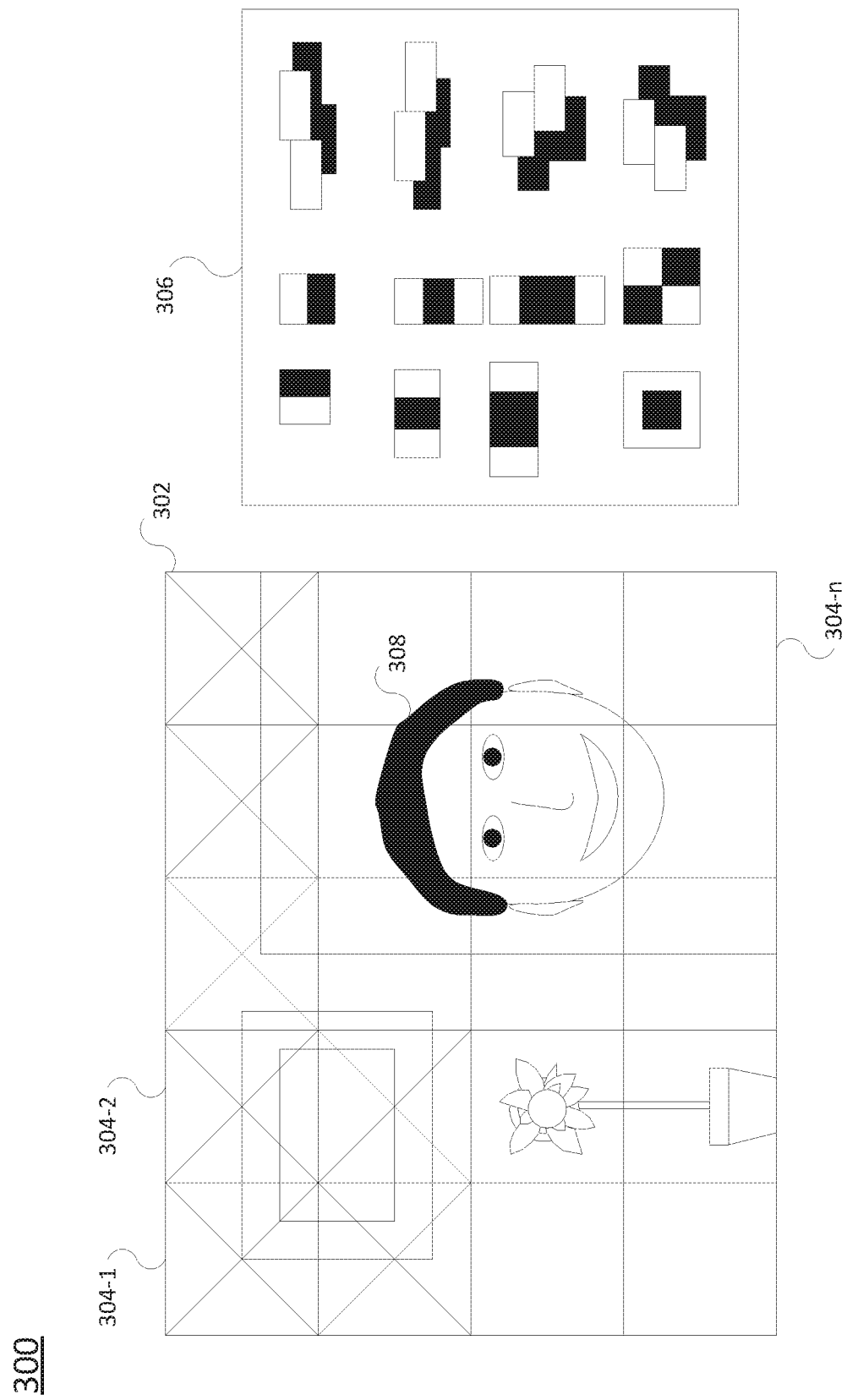
FIG. 3 is a block diagram of an example of performing face detection.

FIG. 3 illustrates a block diagram of an example of performing face detection. FIG. 3 illustrates a video image 302 captured by the camera 102. A pixel block by pixel block analysis may be performed on each pixel block 304-1 to 304-n (herein referred to collectively as pixel blocks 304 or individually as a pixel block 304). The analysis may compare the pixel pattern in each pixel block to a set of predefined pixel patterns 306 that are associated with a face. When the pixel pattern within a pixel block 304 matches one of the predefined pixel patterns in the set of predefined pixel patterns 306, the pixel block 304 is identified as a pixel block 304 having a face. The location of the face of the user 108 may be determined based upon all of the pixel blocks 304 that contain pixel patterns that match one of the predefined pixel patterns in the set of predefined pixel patterns 306.

Returning back to FIG. 2, at block 206, the method 200 performs landmark point detection. For example, certain landmark features (e.g., a nose, a mouth, an eye, an ear, and the like) associate with a face are predefined. The landmark features are detected in the face and associated with the predefined landmark features.

At block 208, the method 200 performs a rotation matrix calculation. In one example, the rotation matrix may be the transformation between an observed landmark point and a predefined landmark point.

At block 210, the method 200 performs a roll, pitch, yaw angle estimation. For example, once all of the observed landmarks are identified, the method 200 may detect the location of the landmarks (e.g., the ear 120 of the user 108) as the user 108.

The method 200 may be continuously repeated to continuously track the desired landmark (e.g., the ear 120 of the user 108) as the user 108 is moving in front of the camera 102. In other words, the location of the ears 120 of the user 108 can be continuously tracked even as the user 108 is moving. In other words, the camera 102 may be continuously capturing video images 302 of the user 108 and the method 200 may be applied to each video image 302 to continuously track a location of the desired landmark (e.g., the ears 120 or the mouth 122 of the user 108). The method 200 ends at block 212.

Referring back to FIG. 1, once the location of the ears 120 are calculated, the server 118 may calculate the counter soundwave, generate the counter soundwave, and output the counter soundwave towards the location of the ears 120. As discussed above, the movement of the speakers 114 may be controlled by the server 118. In other implementations, the speakers may be directional speakers that provide ultrasonic modulation.

As a result, even as the user 108 is moving around in the zone of operation 116, the system 100 may be able to provide ambient noise suppression. For example, the location of the ears 120 of the user 108 may be continuously tracked and the phase of the counter soundwave may be continuously matched to the phase of the ambient noise arriving at the current location of the ears 120 by adjusting a signal sent to each of the speakers 114 or a direction of the speakers 114.

In some implementations, based on the soundwaves of the ambient sounds, the server 118 may predict the soundwaves of the ambient sounds to perform the suppression. For example, the soundwaves of low frequencies (e.g., a hum of a fan) can be predicted or high frequencies that have a constant soundwave pattern (e.g., a high pitched whistling sound).

In one example, the server 118 may use blind source tracking, active noise reduction, active noise cancelling, and the like, to calculate the counter soundwave. In other words, the counter soundwave may be a destructive sound wave that has a same amplitude and an inverted frequency as an amplitude and frequency of the ambient sounds. The counter soundwave when combined with the ambient sounds may suppress the ambient sounds.

In some implementations, the zone of operation 116 may include a plurality of users 108. The ears 120 of each one of the users 108 may be determined. The direction, the amplitude and the frequency of the ambient sounds for each one of the plurality of users 108 may be determined. Then the server 118 may calculate, generate and output, via the speakers 114, a counter soundwave to suppress the ambient sounds for each one of the users 108 in the zone of operation 116. In one example, the counter soundwave may be an average of the amplitude and the frequency of the ambient sounds heard by each one of the plurality of users 108.

As a result, the system 100 may provide ambient noise suppression without requiring the user 108 to wear cumbersome headphones or ear buds. In addition, the system 100 may provide ambient noise suppression to multiple users that are within the zone of operation 116, unlike noise canceling headphones that are used by one, or a single, individual.

In other implementations, the system 100 may also be used to provide clearer audio signals for transmission. In other words, the active noise reduction or active noise cancellation methods can be used to suppress ambient noise from being mixed in with an audio input from the user 108.

For example, the user 108 may want to speak to the user 110 during the conference call. The camera 102 may be used to capture video images of the face of the user 108 and determine a location of the mouth 122 of the user 108. The location of the mouth 122 may be determined using the method 200 described above, similar to how the location of the ears 120 of the user 108 can be determined.

The direction, the amplitude and the frequency of the ambient sounds may be determined by recording the soundwaves of the ambient sounds via the microphones 112 within a zone of operation 150. The server 118 may calculate and generate a counter soundwave to suppress the ambient sounds.

When the user 108 provides an audio input (e.g., when the user 108 speaks) into the voice microphone 106 within the zone of operation 150, the counter soundwave may be applied to the audio input to suppress the ambient noise traversing across the zone of operation 150. As a result, a clear audio signal with a reduced amount of ambient noise may be sent to the user 110.

Figure 4:
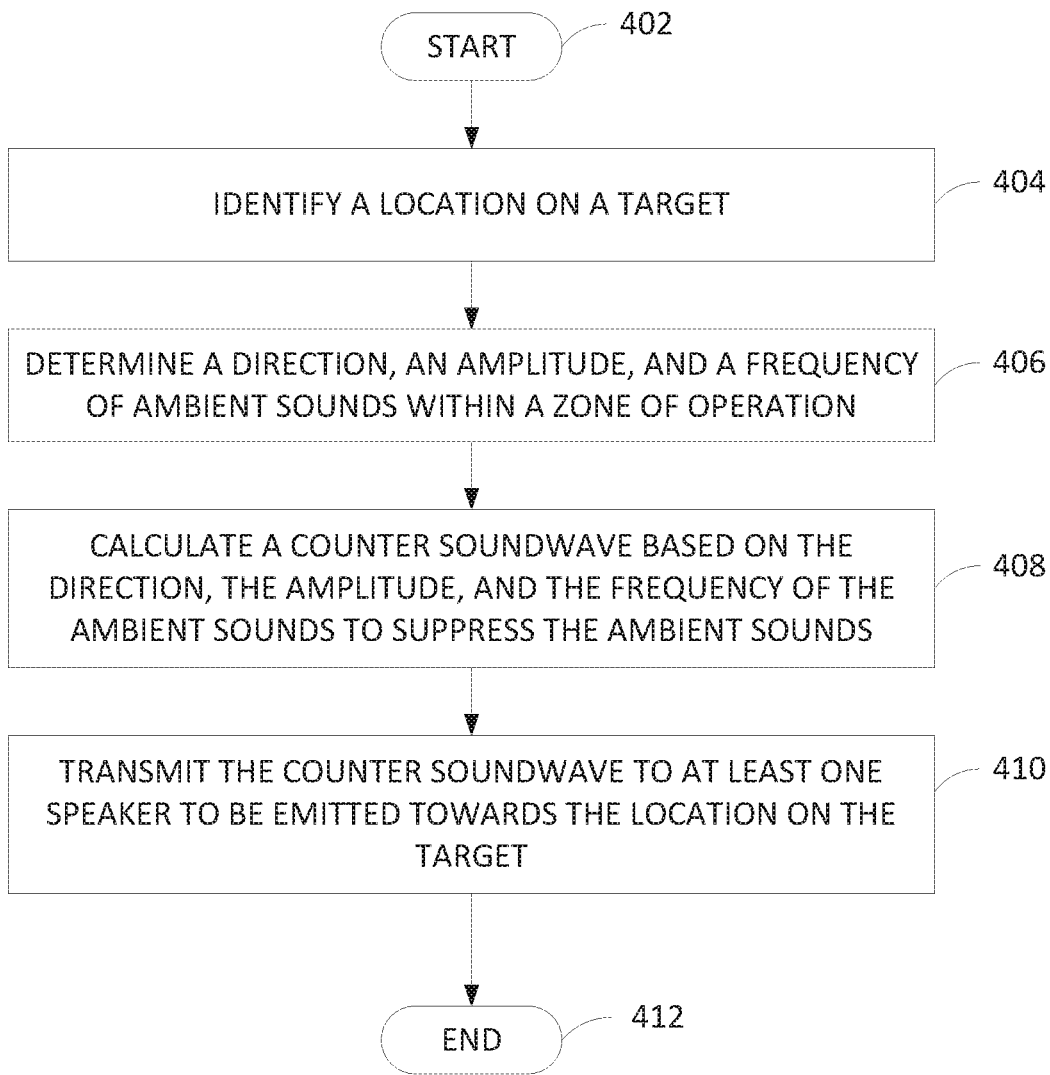
FIG. 4 is a flow diagram of an example method for suppressing ambient sounds.

FIG. 4 illustrates a flow diagram of an example method 400 for suppressing ambient sounds. For example, the ambient sounds may be suppressed to improve sound quality of a user who is listening to incoming audio signals (e.g., another user speaking). In one example, the blocks of the method 400 may be performed by the server 118.

At block 402, the method 400 begins. At block 404, the method 400 identifies a location on a target. For example, the target may be a user and the location on the target may be each ear of the user. The method 200, described above, can be used to identify the location of each ear of the user.

At block 406, the method 400 determines a direction, an amplitude, and a frequency of ambient sounds within a zone of operation. For example, microphones may be positioned around a perimeter of the zone of operation. The microphones may record soundwaves of ambient sounds that enter the zone of operation. Based on the soundwaves recorded by two or more microphones, the server may determine a direction of the ambient sounds. In addition, the soundwaves may be analyzed by the server to determine an amplitude and a frequency of the ambient sounds.

At block 408, the method 400 calculates a counter soundwave based on the direction, the amplitude, and the frequency of the ambient sounds to suppress the ambient sounds. For example, methods such as blind source tracking, active noise reduction, active noise cancellation, and the like may be used to calculate the counter soundwave. The counter soundwave may have an amplitude that is equal to the amplitude of the ambient sounds and a frequency that is phase shifted (e.g., +/−180 degrees) to match the frequency of the ambient sounds. The combination of the ambient sounds and the counter soundwaves results in destructive interference and a reduction of ambient noise that may be detected by the user or users.

At block 410, the method 400 transmits the counter soundwave to at least one speaker to be emitted towards the location on the target. For example, speakers may also be positioned around the perimeter of the zone of operation. The server may control the speakers to emit audio towards the location of the ears of the user. The counter soundwave may be emitted by the speakers in the same direction as the incoming ambient sounds and towards the location of each ear of the user. At block 412, the method 400 ends.

Figure 5:
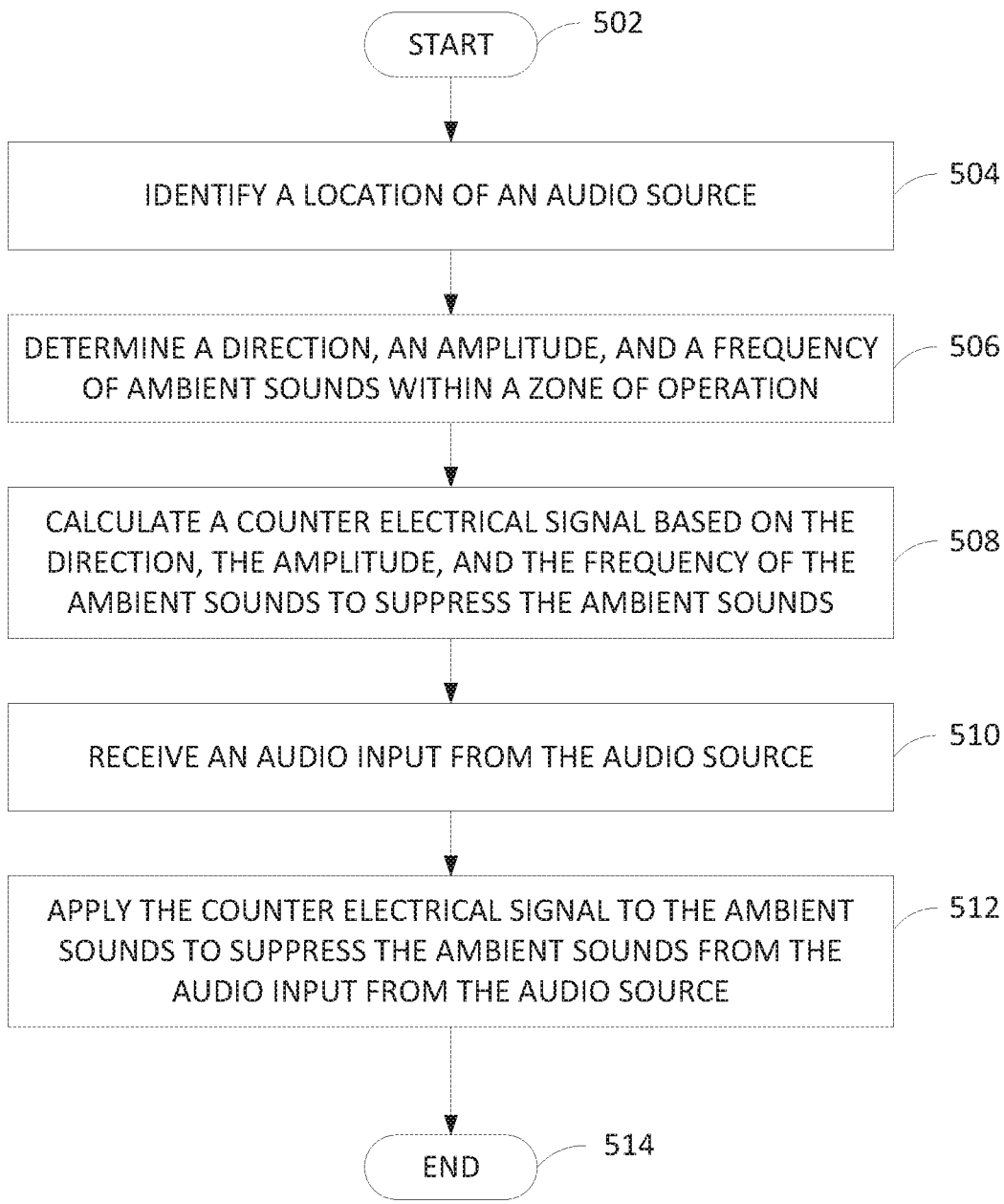
FIG. 5 is a flow diagram of another example method for suppressing ambient sounds.

FIG. 5 illustrates a flow diagram of an example method 500 for suppressing ambient sounds. For example, the ambient sounds may be suppressed to improve sound quality of a user who is transmitting audio to another user (e.g., the user speaking into a microphone to send an audio input to another user). In one example, the blocks of the method 500 may be performed by the server 118.

At block 502, the method 500 begins. At block 504, the method 500 identifies a location of an audio source. For example, the audio source may be a mouth of a user. The method 200, described above, can be used to identify the location of the mouth of the user. A zone of operation may be identified near the location of the mouth of the user. In one example, the zone of operation may include the mouth of the user and a microphone.

At block 506, the method 500 determines a direction, an amplitude, and a frequency of ambient sounds within a zone of operation. For example, microphones may be positioned around a perimeter of the zone of operation. The microphones may record soundwaves of ambient sounds that enter the zone of operation. Based on the soundwaves recorded by two or more microphones, the server may determine a direction of the ambient sounds. In addition, the soundwaves may be analyzed by the server to determine an amplitude and a frequency of the ambient sounds. A microphone in front of the user may also be used to detect and analyze ambient sounds.

At block 508, the method 500 calculates a counter electrical signal based on the direction, the amplitude, and the frequency of the ambient sounds to suppress the ambient sounds. For example, methods such as blind source tracking, active noise reduction, active noise cancellation, and the like may be used to calculate the counter electrical signal. The counter electrical signal may, when connected to the speakers, produce an acoustic wave that is equal to the amplitude of the ambient sounds and with a frequency that is phase shifted (e.g., +/−180 degrees) to match the frequency of the ambient sounds at key points in the zone of operation, such as the location of the ears of the user.

At block 510, the method 500 receives an audio input from the audio source. For example, the user may speak into a microphone within the zone of operation during a conference call. The audio input or the voice of the user may be captured by the microphone.

At block 512, the method 500 applies the counter electrical signal to the ambient sounds within the zone of operation to suppress the ambient sounds from the audio input from the audio source. In one example, speakers may be located near the microphone. The speakers may emit a counter soundwave based on the counter electrical signal within the zone of operation to suppress the ambient sounds from the audio input from the user. As a result, a clear audio signal with reduced ambient noise may be transmitted.

In another implementation, the ambient sounds may be subtracted from the audio input of the user by the server before being transmitted. For example, the counter electrical signal may be applied to the audio input of the user to remove the ambient noise from the audio input. At block 514, the method 500 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A system, comprising:
a camera to capture an image of pupils of a target;
a plurality of microphones to receive ambient sounds;
a plurality of speakers located around a perimeter of a zone of operation to output an audio signal to suppress the ambient sounds; and
a processor in communication with the video camera, the plurality of microphones and the plurality of speakers, wherein the processor automatically begins operation to identify a location on the target and generate an audio signal to suppress the ambient sounds when the target is detected to be within the zone of operation by the camera, identifies a location on the target based on a direction of the pupils that is estimated from the image of the pupils that is captured, determines a direction and a frequency of the ambient sounds, generates the audio signal based on the direction and the frequency of the ambient sounds, and the processor is to move a speaker of the plurality of speakers in three different axes to control a position of the speaker of the plurality of speakers towards the direction of the ambient sounds and to emit the audio signal towards the location on the target in the direction of the ambient sounds.

2. The system of claim 1, wherein the target comprises a user and the location comprises each ear of the user, wherein the processor continuously tracks the location of the each ear of the user as the user moves.

3. The system of claim 1, wherein each one of the plurality of speakers comprises a directional speaker.

4. The system of claim 1, wherein the plurality of microphones is arranged around the perimeter of the zone of operation.

5. A method comprising:
 detecting, by a processor, a target within a zone of operation by a pair of infrared cameras to automatically begin an operation to identify a location on the target and generate an audio signal to suppress ambient sounds;
 capturing, by a processor, an image of pupils of the target;
 identifying, by a processor, the location on the target based on a direction of the pupils that is estimated from the image of the pupils that is captured;
 determining, by the processor, a direction, an amplitude, and a frequency of the ambient sounds within the zone of operation;
 calculating, by the processor, a counter soundwave based on the direction, the amplitude, and the frequency to suppress the ambient sounds;
 moving, by the processor, a position of a speaker of a plurality of speakers located around a perimeter of the zone of operation in three different axes to control a position of the speaker towards the direction of the ambient sounds and to be directed towards the location on the target; and
 transmitting, by the processor, the counter soundwave to the speaker to be emitted towards the location on the target in the direction of the ambient sounds.

6. The method of claim 5, wherein the location on the target comprises each ear on a user, wherein the identifying the location of the each ear of the user comprises:
 detecting, by the processor, a face of the user;
 detecting, by the processor, landmark points on the face of the user;
 calculating, by the processor, a rotation matrix that represents a transformation between the landmark points that are detected and standard landmark points; and
 estimating, by the processor, a roll, a pitch and a yaw angle from the rotation matrix to identify the location of the each ear of the user.

7. The method of claim 5, wherein the counter soundwave is calculated to suppress the ambient sounds at the location on the target.

8. The method of claim 5, further comprising:
 identifying, by the processor, a location on an additional target;
 calculating, by the processor, a second counter soundwave to suppress the ambient sounds at the location on the additional target; and
 transmitting, by the processor, the second counter soundwave to at least one second speaker to be emitted towards the location on the additional target.

9. The system of claim 1, wherein the camera comprises a pair of infrared cameras.

10. The method of claim 5, wherein the image of the pupils of the target is captured by a pair of infrared cameras.

* * * * *